United States Patent [19]
Mercer et al.

[11] Patent Number: 5,096,883
[45] Date of Patent: Mar. 17, 1992

[54] OIL-BASE DRILLING FLUID COMPRISING BRANCHED CHAIN PARAFFINS SUCH AS THE DIMER OF 1-DECENE

[75] Inventors: James D. Mercer, Lake Elsinore, Calif.; Laura L. Nesbit, Nikiski, Ak.

[73] Assignee: Union Oil Company of California, Los Angeles, Calif.

[21] Appl. No.: 745,998

[22] Filed: Aug. 9, 1991

Related U.S. Application Data

[63] Continuation of Ser. No. 414,657, Sep. 29, 1989, abandoned, which is a continuation of Ser. No. 187,218, Apr. 28, 1988, abandoned.

[51] Int. Cl.$^5$ ............................ C09K 7/06; C09K 7/02
[52] U.S. Cl. .................................... 507/103; 507/905; 507/910
[58] Field of Search ........................ 507/103, 905, 910

[56] References Cited

U.S. PATENT DOCUMENTS

| | | |
|---|---|---|
| 2,797,196 | 6/1957 | Dunn et al. |
| 2,816,073 | 12/1957 | Stratton ............................ 252/8.515 |
| 2,943,051 | 6/1960 | Lummus. |
| 3,775,447 | 11/1973 | Andrews, Jr. et al. |
| 3,878,111 | 4/1975 | McGlothlin et al. |
| 4,498,994 | 2/1985 | Heilweil. |
| 4,508,628 | 4/1985 | Walker et al. |
| 4,787,990 | 11/1988 | Boyd ............................... 252/8.511 |
| 4,876,017 | 10/1989 | Trahan et al. ....................... 252/8.51 |

FOREIGN PATENT DOCUMENTS

| | | |
|---|---|---|
| 0124194 | 11/1984 | European Pat. Off. |
| WO83/02949 | 9/1983 | PCT Int'l Appl. .............. 252/8.515 |

OTHER PUBLICATIONS

"Acute Toxicity Assessment of Polyalphaolefin (PAO) Synthetic Fluids", by P. D. Guiney, preprint of paper presented at the Symposium on Synthetic and Petroleum Based Lubricants, Division of Petroleum Chemistry, Inc., American Chemical Society, Mar. 28–Apr. 1, 1982, Las Vegas, Nev., vol. 27, No. 2, pp. 381–391.

"Synthetic Polyalphaolefin Lubricants Today-and Tomorrow", by Marvin Campen et al., National Petroleum Refiners Association, 1981 Fuels and Lubricants Meeting, Nov. 5–6, 1981, Houston, Tex. Publication No. FL–81–86.

Cowan et al., "An Overview of Low Toxicity Oils", paper presented at 1984 Drilling Technology Conference of the International Association of Drilling Contractors, Mar. 19–21.

Material Safety Data Sheet for Emery 3002 Synthetic Hydrocarbon 2 CST Fluid, dated Nov. 13, 1986, by Emergy Chemicals, Division of National Distillers and Chemical Corporation.

Specification sheet titled "PAOL ® Polyalphaolefins—New Possibilities in Synthesized Lubricants."

*Primary Examiner*—John S. Maples
*Assistant Examiner*—Gary L. Geist
*Attorney, Agent, or Firm*—Gregory F. Wirzbicki; Howard R. Lambert; Shlomo R. Frieman

[57] ABSTRACT

A non-toxic drilling fluid (drilling mud), for use in rotary-type well-drilling operations, comprises a non-toxic base-oil consisting essentially of branched-chain paraffins which may or may not contain ester functionalities, the base-oil having: (i) between about 16 and about 40 atoms per molecule, (ii) a kinematic viscosity, at 40° C., of between about 1 and about 16.5 centistokes; (iii) a flash point of at least about 90° C.; and (iv) a pour point of less than about −40° C. Preferably, the branched-chain paraffin used as the base-oil consists essentially of the dimer of 1-decene, which has a viscosity of about 5 centistokes at 40° C. and which has 20 carbon atoms per molecule. The drilling fluid can be about 100 percent base-oil or can be an emulsion of the base-oil in water, in which case the amount of base-oil is at least about 30 volume percent, and is more preferably between about 65 and about 95 volume percent. The drilling fluid additionally includes various additives, including emulsifiers, viscosifiers, weighting agents, oil-wetting agents, densifiers, and/or fluid-loss preventing agents.

20 Claims, No Drawings

OIL-BASE DRILLING FLUID COMPRISING BRANCHED CHAIN PARAFFINS SUCH AS THE DIMER OF 1-DECENE

This application is a continuation of application Ser. No. 07/414,657, filed, Sept. 29, 1989, now abandoned which is a continuation of application Ser. No. 07/187,218, filed Apr. 28, 1988 now abandoned.

BACKGROUND OF THE INVENTION

1. Field of the Invention

The present invention relates generally to drilling fluids used in rotary well-drilling operations and, more particularly, to oil-based drilling fluids which contain a continuous, nonaqueous liquid phase.

2. Background Discussion

When wells (such as oil, gas, and geothermal wells) are drilled using rotary well-drilling equipment, a drilling fluid is typically pumped downwardly through a string of hollow drill pipe to, and outwardly through, a drill bit connected at the bottom end of the drill pipe string. The drilling fluid—commonly referred to as a drilling "mud"—is circulated, by injection-pump pressure, back upwardly from the bottom of the drill pipe string, through the annular space formed between the drill pipe and the surrounding well bore and/or casing, to thereby transport drill bit cuttings and other well debris out of the borehole.

In addition, the flow of drilling mud performs such other important functions as cooling and lubricating the drill bit and the drill pipe (where the pipe contacts the bore walls), preventing the caving in of the borehole in weak formation regions, and overcoming natural formation pressure to thereby restrict entry into the borehole of unwanted fluids from penetrated formations.

The term "mud" applied to drilling fluids contrasts with the fact that drilling fluids are typically quite complex, specially-formulated fluids which play an important, if not critical, role in rotary well drilling operations, especially those in which deep oil or gas wells are being drilled. Drilling muds are, as an illustration, usually formulated to have: (i) a comparatively low viscosity at all temperatures normally encountered, from the wellhead to the bottom of the borehole, so as to minimize pumping problems and costs; (ii) a sufficient density to keep drill bit cuttings and debris in suspension in the event of a shutdown, to thereby prevent settling of the entrained cuttings and debris and plugging of the borehole; and (iii) a relatively high flash point so as to reduce the risk of fires and explosions which might otherwise be caused by use of the drilling mud.

For the most part, the liquid bases selected for drilling muds are aqueous solutions, oils, or emulsions of aqueous and oily materials. Various colloidal substances (such as clays), densifying components (such as barite), and/or special purpose additives (such as corrosion inhibitors, viscosity modifiers and emulsifiers), are usually added to the base liquid to enable the mud to meet the needs for particular drilling operations. These additives importantly function to increase the density and/or viscosity of the mud, to prevent drilling mud loss from the borehole into penetrated formations, and to help keep drill bit cuttings and debris suspended in the mud.

Although, principally due to their lower cost, aqueous solutions are most commonly used as the base liquid for drilling muds, the use of more costly oil-bases for drilling muds often offers important advantages over the use of water-base muds. For example, in addition to being more advantageous to use when drilling into subterranean formations which contain water-swellable clays (which can be damaged by water contact), oil-base drilling muds are usually more effective for lubricating drill bits and drill pipe, and are typically more stable than water-base drilling muds at the high temperatures ordinarily encountered when drilling deep wells. Because of these, and other, advantages, oil-base drilling muds—toward which the present invention is directed—are used in many important well-drilling operations.

Because of their comparatively lower cost and good availability, crude petroleum and petroleum distillate fractions—such as No. 2 diesel, jet "A," and kerosene—have typically been used in the formulation of oil-base drilling muds. Heavy, liquid petroleum residues, such as those containing a large amount of asphaltic materials, are also sometimes used to formulate oil-base drilling muds.

All such petroleum-based oil used for drilling muds typically contain relatively large concentrations of aromatics and at least substantial concentrations of n-olefins—both of which may be harmful or toxic to animal and plant life. Because of this, the continued use of such petroleum based oils in drilling muds may, in some situations and/or locations (for example, in off-shore drilling operations), no longer be economically practical due to the imposition of strict regulations for the protection of the environment.

It is, therefore, a principal objective of the present invention to provide a drilling mud having an base-oil which is not only non-toxic but which has other desirable properties such as low viscosity, low pour point and high flash point.

SUMMARY OF THE INVENTION

A drilling fluid, according to the present invention, is formulated from a substantially non-toxic base-oil which consists essentially of branched-chain paraffins or branched-chain paraffins substituted with an ester functionality, or mixtures thereof, the base-oil preferably having between about 18 and about 40 carbon atoms per molecule and, more preferably, between about 18 and about 32 carbon atoms per molecule. Usually, the base-oil comprises at least about 30 volume percent of the drilling fluid composition.

In the preferred embodiment, the base-oil: (i) has a kinematic viscosity, at 40° C., of between about 1 centistoke (cSt) and about 16.5 cSt, (ii) has a flash point of at least about 93° C. (200° F.), (iii) has a pour point of less than about −40° C. (−40° F.), and (iv) is non-toxic to animal life. Most preferably, in accordance with the preferred embodiment, the base-oil consists essentially of a dimer of 1-decene, which has a kinematic viscosity of about 5 cSt at 40° C.

The drilling fluid of the present invention may contain liquids other than the base-oil, but the base-oil preferably comprises at least about fifty percent of the liquid content of the drilling fluid. In this regard, the drilling fluid can either be essentially nonaqueous or can include an emulsion which contains a significant amount of an aqueous component.

Additionally comprising the drilling fluid of the present invention are preferably such additives as viscosifiers, emulsifiers, salts, fluid loss additives, dispersants, weighting agents, and combinations thereof.

DESCRIPTION OF THE PREFERRED EMBODIMENT

A non-toxic, oil-base drilling fluid or mud, according to the present invention, comprises a non-toxic base-oil used to form a continuous oil-liquid phase, which can include water-in-oil emulsions. The drilling fluid of the present invention may be, but is not necessarily, formulated to have a significant water content. When the drilling fluid does not contain a significant amount of water, it may be termed a nonaqueous drilling fluid. As so used, the term "nonaqueous" refers to the initial composition of the drilling fluid, as opposed, for example, to its subsequent composition after it has been used for a period of time and has absorbed water from penetrated formations or from other sources.

The term "non-toxic" as herein applied to oils means oils which meet such standards as the FDA (Federal Drug Administration) requirements of 21 CFR 178.3620(a)5 and (b), 21 CFR 573.680, or other similar regulations relating to toxicity of synthetic oils. The term "non-toxic" as applied to drilling muds means drilling muds which meet the standard non-toxicity "Ninety-six Hour Static Bioassay" test for mortality on myscid shrimp in accordance with the Federal Register, Vol. 50, No. 165, Apr. 26, 1985, or equivalents thereof.

The non-toxic oils considered by the present inventors to be most suitable base-oils for use in the drilling fluid of the present invention are what are sometimes termed "synthetic oils." This term is usually applied to polymeric substances produced from chemical monomeric materials. In general, synthetic oils do not contain aromatics and are much less toxic than most "natural" crude oils.

Base-oils of the present invention are comprised of branched-chain paraffins and/or branched-chain paraffins substituted with an ester moiety, such paraffins preferably containing between about 16 and about 40 carbon atoms per molecule and, more preferably, between about 16 and about 32 carbon atoms per molecule. (As used herein, a branched-chain paraffin is a saturated, branched-chain hydrocarbon, that is, an alkane. A branched-chain paraffin substituted with an ester moiety, or functionality, is of the formula RCOOR', where R and R' are both unsubstituted alkyl groups, at least one of which is a branched-chain.)

Preferred oils for the oil-bases of the present drilling fluids are branched-chain, saturated hydrocarbons (branched-chain paraffins)--frequently referred to in the lubrication arts as "polyalphaolefins" or "PAO's," and sometimes, generically (and chemically inaccurately), as "isoparaffins." As is more particularly described below, the branched-chain paraffin of preference for formulating the oil-base drilling fluids, according to the present invention, is the dimer of 1-decene (decylene), which has 20 carbon atoms per molecule.

In contrast to branched-chain paraffins, straight-chain, saturated hydrocarbons are known as "normal paraffins" or "n-paraffins." Although, as a rule, none of the paraffins reacts readily with acids and oxidizing agents, it is important to understand that at least some of the physical properties of the branched-chain paraffins are very much different than those of corresponding n-paraffins having the same numbers of carbon atoms per molecule. In this respect, branched-chain paraffins having up to about 40 carbon atoms per molecule are liquids over the temperature range of interest for drilling fluids; whereas, n-paraffins having more than about 16 carbon atoms are waxy solids, with refined paraffin wax consisting of n-paraffins having at least about 23 carbon atoms per molecule. Consequently, the use of branched-chain paraffins, instead of n-paraffins, is particularly advantageous for drilling fluids which are required to maintain a relatively low-viscosity over a wide temperature range.

Branched-chain paraffins are most commonly produced by first oligomerizing low molecular weight, n-alpha olefins and/or ethylene to form an intermediate product which consists almost entirely of branched-chain molecules. This branched-chain, intermediate product is then hydrogenated to saturate the molecules so that the final product consists almost entirely of branched-chain, saturated molecules.

As mentioned above, to provide a relatively low viscosity drilling fluid, it is preferred that the base-oil used in the drilling fluid of the present invention consist essentially of (that is, be at least about 95 percent) branched-chain paraffins having between about 16 and about 40 carbon atoms, and more preferably between about 18 and about 32 carbon atoms, per molecule. As the number of carbon atoms per molecule increases above about 40, even most branched-chain paraffins become too viscous for practical use as base-oils for drilling muds.

Moreover, the present inventors have determined that the branched-chain paraffin which is the dimer of 1-decene (decylene), and for which the number of carbon atoms per molecule is 20, is particularly advantageous for use as an oil base in drilling muds because of its low viscosity, and other beneficial characteristics described below.

In general, however, the branched-chain paraffins useful in formulating the drilling fluid of the present invention can, of course, be mixtures of different branched-chain paraffins having different numbers of carbon atoms per molecule, since such mixtures are ordinarily formed in the above-mentioned oligomerization process by which branched-chain paraffins are made. The numbers of carbon atoms per molecule of the different branched-chain paraffins in any such mixture are, however, preferably in the above-mentioned preferred and more preferred ranges.

A parameter important to the selecting of base-oils useful for formulating the drilling fluid of the present invention is kinematic viscosity (which, at 40° C., is preferably at least about 1 centistoke (cSt)) to enable the suspension of particulates, such as drill cuttings, in the drilling fluid in which the oil-base is used. Although limited at the upper end by the number of carbon atoms present in the molecules which form the base-oil, the maximum oil viscosity is preferably no more than about 16.5 cSt at 40° C. so that excessive power is not required to pump a drilling fluid comprised of the oil.

Another important parameter of the drilling fluid base-oil is its pour point (a measure of the lowest temperature at which a fluid flows), an oil having a pour point of less than about −40° C. (−40° F.) being preferred to enable use of the drilling fluid under cold temperature conditions. Furthermore, for operating safety reasons, the base-oil should have a relatively high flash point, a flash point of at least about 90° C. (194° F.) being preferred.

As stated previously, a particular branched-chain paraffin which has been discovered by the present inventors to be especially useful as the base-oil for drilling fluids is the dimer of 1-decene, sometimes referred to commercially and/or sold as "1-decene dimer." Such an branched-chain paraffin is produced by oligomerizing 1-decene (usually itself synthesized by the polymerization of ethylene) and then hydrogenating the resulting material to yield a product having an empirical formula of $C_{20}H_{42}$.

The dimer of 1-decene is presently available as an engine oil, lubricant, and the like, being sold, in some instances, under the commercial designations of "two cSt polyalphaolefin" or "two cSt PAO". For example, such material is available from the Synthetic Lubricants Group, Emery Chemicals, Division of National Distillers and Chemical Corporation, 11501 Northlake Drive, Cincinnati, Ohio 45249 as "Emery 3002 Two Centistoke PAO," the characteristics of which are more particularly described below in Example 1.

A principal reason for selecting branched-chain paraffins as base-oils for the drilling fluid of the present invention is that these paraffins not only have the needed physical characteristics (including low viscosity, low melting point, high flash point, etc.) but are widely recognized as being non-toxic. As abovementioned, strict environmental regulations can be expected to increasingly limit the use of natural petroleum base oils, such as diesel oils or natural oil derivatives, most of which contain substantial concentrations of aromatics and at least some n-olefins, and which are, therefore, considered to be at least somewhat toxic.

With respect to the non-toxicity of branched-chain paraffins, the "Emery 3002 Two Centistoke PAO" is advertised by Emery Chemicals as meeting the FDA requirements for 21 CFR 178.3620(b) (for a number of different uses) and for 21 CFR 573.680 (for use in animal feeds).

In addition, mammalian toxicity tests of 2cSt and 8 cSt polyalphaolefins (branched-chain paraffins) are reported in a paper titled "Acute Toxicity Assessment of Polyalphaolefin (PAO) Synthetic Fluids," presented by P. D. Guiney at the Symposeum on Synthetic and Petroleum Based Lubricants, sponsored by the American Chemical Society in Las Vegas, Nev., Mar. 28 through Apr. 1, 1982. This paper by Guiney was published by the Division of Petroleum Chemistry, Inc. of the American Chemical Society, in *Preprints Vol. 27, No. 2*, March 1982, pages 381-391, and is incorporated herein in its entirety by specific reference.

In the above-cited Guiney paper, the author reports the results of a number of different PAO toxicity tests (including acute oral, acute dermal, ocular irritation, primary skin irritation and acute inhalation LC-50 tests) performed on laboratory animals. It is concluded (at page 387 of the paper) that the acute toxicities of both the 2 cSt and the 8 cSt PAO's tested were very low, it being further concluded from the test results that the toxicity of PAO's with viscosities between 2cSt and 8cSt would be substantially the same as the toxicity of the 2 cSt and 8 cSt PAO's tested. Furthermore, the Guiney paper makes a favorable comparison between the results of the 2 cSt and 8 cSt PAO toxicity test results and previously published toxicity reports relating to conventional mineral oils obtained from paraffinic petroleum base stocks.

Other materials are typically added to the base-oil of the drilling mud to modify such characteristics as fluid viscosity, particle-suspending ability, density and so forth. It is understandably important that the materials added to the base-oil in formulating the drilling mud be non-toxic or be added only in non-toxic amounts; little benefit is achieved in using a non-toxic oil as an oil base if the addition of modifying agents render the drilling mud, as a whole, toxic.

Regarding such modifying agents, viscosity and particulate suspending ability are established by a number of the components of the drilling fluid, and can be increased by the addition of such materials as clays and polymers. The more commonly used clays are bentonite (sodium form of montmorillonite) and attapulgite. However, many other clay types and mixtures of clay are also useful in the present oil-base drilling fluid. Typically, to improve their wettability by the oil base, the clays are reacted with organic compounds which have cationic functional groups, for example, quaternary ammonium salts which contain alkyl groups of at least about 12 carbon atoms per molecule. Polymeric substances useful for increasing the viscosity of the present oil-base drilling fluid include polyacrylates, cellulose derivatives, starches, gums, and polymers produced by bacteria such as *Xanthomonas campestris*.

The density of the drilling fluids of the present invention can, if necessary, be increased by the addition of "weighting agents," such as barite, galena, iron oxides, siderite, and the like, which are commonly used as the naturally occurring minerals. To assist in maintaining these solid additives in suspension in the oil-base drilling fluid, materials are commonly added to the drilling fluid to facilitate oil wetting of the additives. Representative of useful oil wetting agents are lecithin and various known surface active agents, such as the organic esters of polyhydric alcohols, described in U.S. Pat. No. 2,943,051 (to Lummis).

To prevent the migration of liquids from the oil-base drilling fluids (frequently called "filter loss") outwardly into formations into which wells are drilled, fluid loss-preventing agents are preferably added to the drilling fluids of the present invention. These loss-preventing agents typically act by coating the walls of the borehole as the well is being drilled, and may, for example, be organophilic humates prepared by reacting humic acid with amides of polyalkylene polyamines or may be any other non-toxic fluid loss additive. Certain of the humates have improved high-temperature performance of drilling fluids, as is described in U.S. Pat. No. 3,775,447 (to Andrews, et al.). One high-temperature humate composition considered by the present inventors to be very useful in the present oil-base drilling fluids is marketed by the NL Baroid Division of NL Industries Inc., as DURATONE HT.

The drilling fluids of the present invention can be prepared in a manner analogous to those normally used to prepare oil-base drilling fluids. In one representative procedure for producing an emulsion fluid, the desired quantity of base-oil and an emulsifier are mixed together, then the remaining components are added sequentially with continuous mixing.

Using an aqueous phase and an emulsifying agent, branched-chain paraffins can be used to form water-in-oil emulsions suitable for use in drilling fluids of the present invention. The aqueous phase can be fresh water, or can be water having dissolved salts in any desired amount. Such dissolved salts are, for example, used to increase fluid density, decrease the swelling effects of aqueous matter on formation clays, and reduce hole enlargement caused by the dissolution of formation components which are water soluble. Suitable salts for dissolving in the aqueous phase include, without limitation, sodium chloride, potassium chloride, calcium chloride, and mixtures thereof.

An oil-water emulsion is formed by vigorously mixing together the branched-chain paraffin, the aqueous phase and the emulsifying agent in desired proportions. The emulsifier may be a "primary emulsifier," either used alone or in combination with a "secondary emulsifier." Various primary emulsifiers are known in the art as useful for oil-base fluids which use crude oil or its fractions as a base. These primary emulsifiers include fatty acid mixtures (which function after their conversion to soaps, and therefore require the presence of sufficient alkaline earth metal ions to form the soaps) and modified sodium salts of higher organic acids. Other materials, such as triglycerides and sulfonates, can also be used as primary emulsifiers in the drilling fluids of the present invention provided that the materials used are non-toxic or are used in non-toxic amounts.

Secondary emulsifiers, which assist in maintaining phase stability at high temperatures and in the presence of brines, include materials such as polyamides. Suitable polyamide emulsifiers include those produced by reacting a polyalkylene polyamine with a fatty acid, using greater than a stoichiometric amount of the amine, then reacting all remaining amine material with such dicarboxylic acids as maleic acid and fumaric acid.

When a water-in-oil emulsion composition is desired, the amount of branched-chain paraffin oil used in the emulsion is typically between about 65 and about 95 volume percent of the total of the oil and aqueous liquids, with a more preferred range of the oil content being between about 75 and about 92 volume percent. However, the water-in-oil emulsion can also be comprised of at least about 50 volume percent of the base-oil. Although, if salts are to be dissolved in the aqueous phase, they can (as above-mentioned) be added in any desired amount, a preferred salt concentration is between about 20 and about 35 weight percent of the aqueous phase.

Weighting agents are preferably added in an amount which provides the desired fluid density, as is known in the art. Other additives, mentioned above, are advantageously present in the approximate amounts set forth below:

1. An emulsifier—about 1 to about 7 kilograms per cubic meter of the drilling fluid;
2. A clay or polymer viscosifier—about 0.7 to about 5 kilograms per cubic meter of the drilling fluid;
3. An oil wetting agent--up to about 4 kilograms per cubic meter of the drilling fluid; and
4. A filter loss agent—up to about 7 kilograms per cubic meter of the drilling fluid.

It is, of course, to be understood that other, non-toxic additives, known in the well drilling art for imparting specially required properties to drilling fluids, may also or alternatively be added to the oil-base drilling fluid of the present invention as the need arises. The omission of any discussion herein concerning such other additives is not intended to preclude their use in the present oil-base drilling fluid.

The invention will be further described by the following EXAMPLES, which are not intended to be limiting, the invention being defined solely by the appended claims.

EXAMPLE 1

A non-toxic, oil-base drilling fluid is prepared using as the base-oil a branched-chain paraffin consisting essentially of the dimer of 1-decene marketed, as above-mentioned, by Emery Chemicals, as "Emery 3002 Two Centistoke PAO." As specified by the manufacturer, this oil has (i) a viscosity of about 1.7 centistokes at 100° C. and of about 5.1 centistokes at 40° C., (ii) a pour point of about −70° C., (iii) a boiling point of about 177° C., (iv) a flash point of about 165° C., and (v) a specific gravity about 0.790 at 15.6° C.

The drilling fluid, which is an invert emulsion, is prepared by agitating about 240 milliliters of the above-specified oil for about 1 minute using a Multi-Mixer, then sequentially adding (with continuous mixing for about one minute after each material is added): (i) about 6 grams of a primary emulsifier, Invermul NT marketed by Baroid Division of NL Industries, Inc.; (ii) about 8 grams of lime (calcium hydroxide); and (iii) about 4 grams of a fluid-loss preventing agent, Duratone HT, which is a chemically modified lignite (humate) marketed by NL Baroid Division.

Next, there is added to the above mixture about 39 milliliters of fresh water and the resulting mixture is mixed for about ten minutes. Then, about 11 grams of an amine-treated bentonite, marketed as Geltone II by NL Baroid Division, is added, and the mixture is agitated for about 15 minutes.

Thereafter, the following materials are added in sequence, with about 5 minutes of mixing after each of the materials is added: (i) about 2 grams of a secondary emulsifier, EZ-Mul NT from NL Baroid Division; (ii) about 210 grams of powdered barite (a non-toxic weighting agent); (iii) about 24 grams of calcium chloride dehydrate (to provide salinity to the water phase without water wetting the barite); and (iv) about 20 grams of a powdered material (Rev Dust) which simulates drilled formation particulates.

The resulting mixture is transferred to a stainless steel vessel which is then pressurized with nitrogen to about 500 psig and is then placed on a rolling apparatus inside an oven set at about 150° F. (65.6° C.), for about 16 hours of aging.

Rheological properties of the aged mixture are determined at 150° F. (65.6° C.) and are as set forth below in TABLE I.

TABLE I

| Parameter | Value |
| --- | --- |
| Fann Viscometer Dial Reading at: | |
| 600 RPM | 71 |
| 300 RPM | 45 |
| 3 RPM | 10 |
| Plastic Viscosity | 26 centipoise |
| Yield Point | 19 lb./100 ft.$^2$ |
| 10 Second Gel Strength | 16 lb./100 ft.$^2$ |
| 10 Minute Gel Strength | 25 lb./100 ft.$^2$ |
| Density | 11.45 lb./gallon |
| Filtrate at 300° F. and 500 psig | 23 milliliter |
| Emulsion Stability | 2000 volt |

The low plastic viscosity of the above constituted fluid, combined with its high yield point and gel strength, provide a drilling fluid which will effectively suspend solids to clean the borehole while maintaining a low pumping pressure. The relaxed fluid loss (of 29 ml) allows for rapid drilling, but may be adjusted by the addition of more fluid-loss agents if a lower fluid loss is desired. Accordingly, the described composition has appropriate characteristics for use as an oil-base drilling fluid.

EXAMPLE 2

A 100 percent oil-base drilling fluid is formulated using as the base-oil a branched-chain paraffin consisting essentially of the dimer of 1-decene, marketed as set forth above, by Emery Chemicals as Emery "3002, Two Centistoke PAO," the characteristics of which are set forth above in EXAMPLE 1. The composition of the drilling fluid is a shown in TABLE 2.

TABLE 2

| Materials | Amount |
| --- | --- |
| Emery "3002" oil | 220 grams |
| TRUVIS[1] | 6 grams |
| TRUMUL[2] | 3 ml. |
| TRUPERSE[3] | 0.5 ml. |
| TRULOSS[4] | 6 ml. |
| TRUDRILL S[5] | 9 grams |
| Barite | 215 grams |
| Lime | 6 grams |

Notes:
[1]TRUVIS is a non-polar oil viscosifier supplied by International Drilling Fluids Inc., 2707 North Loop West, Suite 550, Houston, Texas 77008.
[2]TRUMUL is a primary emulsifier supplied by International Drilling Fluids Inc.
[3]TRUPERSE is an oil wetting agent and solid dispersant supplied by International Drilling Fluids Inc.
[4]TRULOSS is a polymeric filtration control agent supplied by International Drilling Fluids Inc.
[5]TRUDRILL S is a filtration reducing agent supplied by International Drilling Fluids Inc.

The mixing procedure is as follows: The oil is stirred at high speeds using a conventional mixer; the TRULOSS is added and the mixing is continued for two minutes. The TRUVIS is then added and the mixture is mixed at a moderate speed for five to ten minutes, at which time the TRUMIL, TRUPERSE, and TRUDRILL S materials are added to the mixture in any order. The mixing is continued for three to five minutes, at which time the lime is added, with mixing then continued for two minutes. Finally, the barite is added and the mixture is mixed for an additional 20 minutes.

The mixture is transferred to a stainless steel vessel and is hot rolled at 200° F. for about 16 hours. Before analyzing, the mixture is returned to the mixer and is mixed for about five minutes, the rheology parameters being then measured at 120° F., the results being as shown in TABLE 3.

TABLE 3

| Parameter | Value |
| --- | --- |
| Fann Viscometer Dial Reading at: | |
| 600 RPM | 72 |
| 300 RPM | 42 |
| Plastic Viscosity | 30 centipoise |
| Yield Point | 9 Lb./100 Ft.$^2$ |
| 10 Sec. Gel Strength | 10 Lb./100 Ft.$^2$ |
| 10 Min. Gel Strength | 30 Lb./100 Ft.$^2$ |
| Density | 11 Lb./Gal. |
| Filtrate at 300° F. and 500 psig (HTHP) | 7–8 milliliter |

A higher yield point of 15 Lb./100 Ft.$^2$ is provided—without significantly affecting the values of plastic viscosity, gel strength, density, and HTHP shown in Table 3—by increasing the amount of TRUVIS additive by 3 grams (from the 6 grams shown in Table 2 to 9 grams).

This Example demonstrates that a low-viscosity, high yield point, low fluid loss drilling fluid can be generated using 100 percent of the dimer of 1-decene without requiring any water in the system.

Although there has been described above a non-toxic, oil-base drilling fluid in accordance with the present invention for purposes of illustrating the manner in which the invention can be used to advantage, it is to be understood that the invention is not limited thereto. Accordingly, any and all modifications and variations thereto which occur to those skilled in the art are to be considered to be within the scope and spirit of the invention as defined in the claims appended hereto.

What is claimed is:

1. A drilling fluid comprising:
   (a) at least about 30 volume percent of a non-toxic base-oil; and
   (b) at least one additive selected from the group consisting of emulsifiers, viscosifiers, weighting agents, oil-wetting agents, densifiers, and fluid-loss preventing agents, at least about 95 percent of the base-oil content of the drilling fluid being one or more branched-chain paraffins having between 18 and about 40 carbon atoms per molecule.

2. The drilling fluid of claim 1 consisting essentially of (a) and (b).

3. The drilling fluid of claim 1 essentially free of aromatics, n-olefins, and normal paraffins.

4. The drilling fluid of claim 1 consisting essentially of (a) and (b) and essentially free of aromatics, n-olefins, and normal paraffins.

5. The drilling fluid of claim 1 wherein the branched-chain paraffins have between 18 and about 32 carbon atoms per molecule.

6. The drilling fluid as claimed in claim 1 wherein the base-oil consists essentially of the dimer of 1-decene.

7. The drilling fluid of claim 1 comprising a water-in-oil emulsion of water and said base-oil.

8. The drilling fluid of claim 7 wherein the base-oil comprises at least about 50 volume percent of the water-in-oil emulsion.

9. The drilling fluid of claim 7 wherein the base-oil comprises between about 65 and about 95 volume percent of the water-in-oil emulsion.

10. The drilling fluid of claim 7 wherein the base-oil comprises between about 75 and about 92 volume percent of the water-in-oil emulsion.

11. The drilling fluid of claim 10 wherein at least about 95 percent of the base-oil content of the drilling fluid is the dimer of 1-decene.

12. The drilling fluid of claim 1 wherein
    the non-toxic base-oil has (i) between 18 and about 32 carbon atoms per molecule, (ii) a kinematic viscosity of between about 1 centistoke and about 16.5 centistokes at 40° C., (iii) a flash point of at least about 90° C., and (iv) a pour point of less than about −40° C.

13. The drilling fluid of claim 1 comprising a water-in-oil emulsion of water and the base-oil, wherein the base-oil is the dimer of 1-decene and comprises at least about 50 volume percent of the water-in-oil emulsion.

14. A drilling fluid comprising:
    (a) at least about 30 volume percent of a non-toxic base-oil; and
    (b) one or more additives, at least one of which is selected from the group consisting of emulsifiers, viscosifiers, weighting agents, oil-wetting agents, densifiers, and fluid-loss preventing agents, the base-oil content of the drilling fluid consisting of the dimer of 1-decene.

15. The drilling fluid of claim 14 consisting essentially of (a) and (b).

16. The drilling fluid of claim 14 consisting of (a) and (b).

17. A drilling fluid comprising:
(a) a continuous oil phase comprising between 65 and 95 volume percent of a non-toxic base-oil;
(b) a discontinuous aqueous phase containing between 20 and 35 volume percent of dissolved inorganic salts;
(c) between about 1 kilogram and about 7 kilograms of emulsifying agents per cubic meter of the drilling fluid;
(d) between about 0.7 kilogram and about 5 kilograms of clay or polymer viscosifier per cubic meter of the drilling fluid;
(e) up to about 4 kilograms of an oil wetting agent per cubic meter of the drilling fluid; and
(f) up to about 7 kilograms of a filter loss agent per cubic meter of the drilling fluid, at least about 95 percent of the base-oil content of the drilling fluid being one or more branched-chain paraffins having between 18 and about 40 carbon atoms per molecule.

18. The drilling fluid of claim 17 wherein at least about 95 percent of the base-oil content of the drilling fluid is the dimer of 1-decene.

19. The drilling fluid of claim 17 wherein the branched-chain paraffins have between 18 and about 32 carbon atoms per molecule.

20. The drilling fluid of claim 17 wherein the base-oil content of the drilling fluid consists essentially of the dimer of 1-decene.

* * * * *

UNITED STATES PATENT AND TRADEMARK OFFICE
CERTIFICATE OF CORRECTION

PATENT NO. : 5,096,883

DATED : March 17, 1992

INVENTOR(S) : James D. Mercer and Laura L. Hammond

It is certified that error appears in the above-identified patent and that said Letters Patent is hereby corrected as shown below:

Title page:

Item (75) Inventors: replace "Laura L. Nesbit" with -- Laura L. Hammond --.

Column, line 11, replace "Emergy" with -- Emery --.

Signed and Sealed this

Twenty-fifth Day of May, 1993

Attest:

MICHAEL K. KIRK

Attesting Officer

Acting Commissioner of Patents and Trademarks